United States Patent
Wilfert

[11] 3,722,320
[45] Mar. 27, 1973

[54] FOOT PEDAL FOR MOTOR VEHICLE

[75] Inventor: Karl Wilfert, Gerlingen-Waldstadt, Germany

[73] Assignee: Daimler-Benz Aktiengesellschaft, Stuttgart-Unterturkheim, Germany

[22] Filed: June 29, 1971

[21] Appl. No.: 157,831

[30] Foreign Application Priority Data

June 30, 1970 Germany....................P 20 32 159.9

[52] U.S. Cl..........................................74/560, 74/563
[51] Int. Cl. ................................................G05g 1/16
[58] Field of Search...............................74/560, 563

[56] References Cited
UNITED STATES PATENTS

| 2,722,847 | 11/1955 | Petrochko | 74/560 X |
| 2,937,542 | 5/1960 | Mastrandrea | 74/563 |
| 3,287,992 | 11/1966 | Smith | 74/563 X |
| 1,618,652 | 2/1927 | Grant | 74/560 X |
| 1,875,399 | 9/1932 | Ritz Woller | 74/563 |
| 2,203,933 | 6/1940 | Thorp | 74/560 X |

*Primary Examiner*—Charles J. Myhre
*Assistant Examiner*—F. D. Shoemaker
*Attorney*—Craig, Antonelli and Hill

[57] ABSTRACT

A foot pedal for motor vehicles which is covered over the largest part of its length with an elastic foamed material at least on the surface of the foot pedal facing the driver.

19 Claims, 6 Drawing Figures

PATENTED MAR 27 1973 3,722,320

INVENTOR
KARL WILFERT

BY Craig Antonelli + Hill
ATTORNEYS

FOOT PEDAL FOR MOTOR VEHICLE

The present invention relates to foot pedals for motor vehicles which are so constructed that in case of accidents the injury danger to the driver is at least strongly reduced by the same.

This is attained according to the present invention in that at least the surface of the foot pedal facing the driver is covered over the largest part of its length with an elastic foamed material.

Preferably, the foot pedal is formed about its entire circumference over the largest part of its length and is provided on the side facing the driver with a thicker foamed material layer than on the side opposite the driver.

The possibility that the driver's foot actuating the pedal gets stuck at the pedal can be prevented according to the present invention in that the foamed layer — as viewed in plan view — is enlarged within the area of the foot plate of the foot pedal preferably continuously up to the width of the foot plate and that — as viewed in cross section — the width of the foamed layer increases preferably continuously from the side opposite the driver to the side facing the driver of the foot pedal.

Accordingly, it is an object of the present invention to provide a foot pedal for motor vehicles which obviates the aforementioned shortcomings and drawbacks encountered in the prior art.

Another object of the present invention resides in a foot pedal for motor vehicles which greatly reduces the injury danger for the driver in case of accidents.

A further object of the present invention resides in a safety foot pedal for motor vehicles which is simple in construction yet minimizes the danger of injury in case of accidents.

These and further objects, features and advantages of the present invention will become more obvious from the following description when taken in connection with the accompanying drawing which shows, for purposes of illustration only, several embodiments in accordance with the present invention, and wherein.

Figure 1:
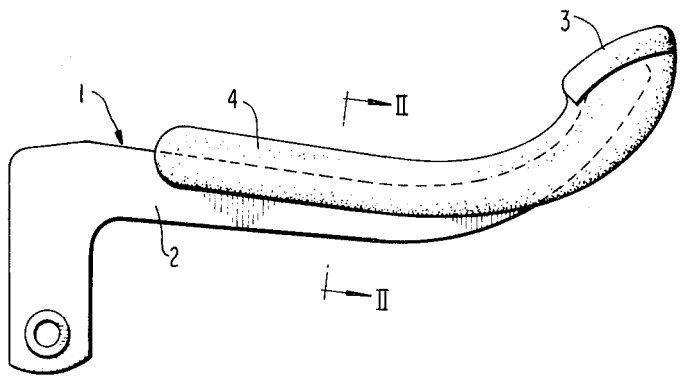
FIG. 1 is a side view of a foot pedal according to the present invention which is not provided with foamed material about its entire circumference.
Figure 2:
FIG. 2 is a cross-sectional view taken along line II—II of FIG. 1.

Referring now to the drawing wherein like reference numerals are used throughout the various views to designate like parts, and more particularly to FIGS. 1 and 2, the foot pedal illustrated in these figures is generally designated by reference numeral 1 which consists of a flat-section or flat-profile member 2 with a foot plate 3 adjoining the same; the foot pedal 1 is covered on its top side facing the driver by a foamed material layer 4.

Figure 3:
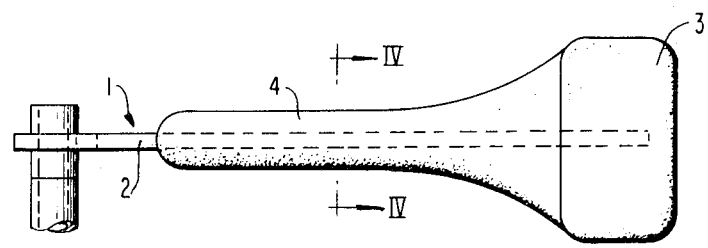
FIG. 3 is a plan view on a modified embodiment of a foot pedal of the present invention which is foamed about its entire circumference over the largest part of its length.
Figure 4:
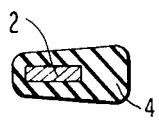
FIG. 4 is a cross-sectional view taken along line IV—IV of FIG. 3.

The foot pedal generally designated by reference numeral 1 and illustrated in FIGS. 3 and 4 is also constituted by a flat-section or a flat profile member 2 and a foot plate 3 but is surrounded completely by a foamed material layer 4 over the largest part of its length. This foamed material layer 4 is — as can be seen from FIG. 3 — enlarged within the area of the foot plate 3 up to the width of the latter in order to prevent a getting-stuck of the foot actuating the pedal. For the same reason, the width of the foamed material layer 4 continuously increases from the bottom side opposite the driver — from the left side as viewed in FIG. 4 — to the side facing the driver — to the right as viewed in FIG. 4.

Figure 5:
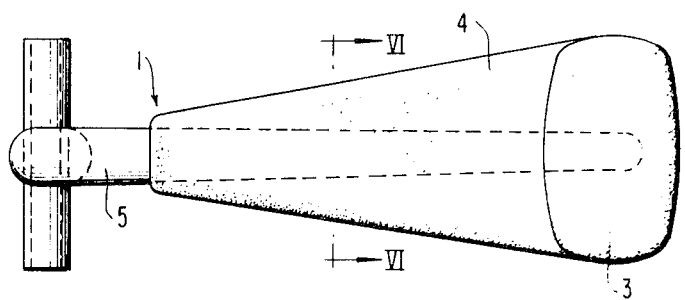
FIG. 5 is a plan view on a still further modified embodiment of a foot pedal which is constructed similar to that of FIGS. 3 and 4.
Figure 6:
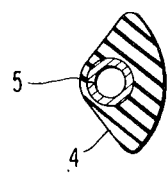
FIG. 6 is a cross-sectional view taken along line VI—VI of FIG. 5.

The foot pedal generally designated by reference numeral 1 and illustrated in FIGS. 5 and 6 does not consist of an upright flat material but instead of a pipe or tubular member 5. The foamed material layer 4 is thereby constructed analogously corresponding to the embodiment illustrated in FIGS. 3 and 4 and — as viewed in plan view — is rectilinearly enlarged conically up to the width of the foot plate 3.

While I have shown and described only three embodiments in accordance with the present invention, it is understood that the same is not limited thereto but is susceptible of numerous changes and modifications as known to those skilled in the art. For example, any suitable foamed material, such as foamed synthetic resinous materials of conventional type may be used. Furthermore, it may also be advantageous under certain circumstances if the foamed material layer extends with the width of the foot plate at least over a large portion of the length of the foot pedal or if its width even increases from the foot plate to the bearing place of the foot pedal. Thus, it is obvious that the present invention is not limited to the details shown and described herein, and I therefore do not wish to be limited to the details shown and described herein but intend to cover all such changes and modifications as are encompassed by the scope of the appended claims.

I claim:

1. A foot pedal for motor vehicles comprising: a foot plate engageable with a driver's foot during normal operation of the foot pedal, a profile member extending from said foot plate to a bearing place for the foot pedal, and an elastic foamed material layer completely surrounding said profile member along the largest portion of the length of said profile member for cushioning the impact of a driver's foot or the like against all sides of said foot pedal.

2. A foot pedal according to claim 1, wherein said foamed material layer is thicker on the upper side of the profile member than on the lower side thereof.

3. A foot pedal according to claim 1, wherein said foamed material layer is thicker adjacent the foot plate end of the profile member than adjacent the bearing place end of the profile member.

4. A foot pedal according to claim 3, characterized in that the foamed material layer — as viewed in plan view — is enlarged within the area of the foot plate of the foot pedal substantially up to the width of the foot plate.

5. A foot pedal according to claim 4, characterized in that the foamed material layer is enlarged continuously from a position adjacent the bearing place up to the width of the foot plate.

6. A foot pedal according to claim 1, characterized in that the thickness of the foamed material layer — as viewed in cross section — increases from the side of the profile member and foot plate opposite the driver to the side facing the driver.

7. A foot pedal according to claim 6, characterized in that the foamed material layer increases continuously from the side opposite the driver to the side facing the driver.

8. A foot pedal according to claim 6, characterized in that the foamed material layer — as viewed in plan view — is enlarged within the area of the foot plate of the foot pedal substantially up to the width of the foot plate.

9. A foot pedal according to claim 8, characterized in that the foamed material layer is enlarged continuously up to the width of the foot plate.

10. A foot pedal according to claim 9, characterized in that the foamed material layer increases continuously from the side opposite the driver to the side facing the driver.

11. A foot pedal according to claim 9, characterized in that the width of the foamed material layer is enlarged substantially conically from a position adjacent the bearing place up to the width of the foot plate at the foot plate.

12. A foot pedal according to claim 10, characterized in that the profile member is completely surrounded by foamed material over the largest part of its length and is provided on the side facing the driver with a thicker foamed material layer than on the side opposite the driver.

13. A foot pedal according to claim 1, wherein said profile member is constructed as a vertically extending flat plate member, wherein said foamed material layer is formed symmetrically with respect to the vertical center plane of said flat plate member, said foamed material layer being thicker in the lateral direction at the end of the plate member adjacent the bearing place than at the end of the plate member adjacent the foot plate.

14. A foot pedal according to claim 13, wherein said foamed material layer is thicker along the top of said plate member than along the bottom of said plate member.

15. A foot pedal according to claim 13, wherein said foamed material layer is enlarged continuously in the lateral direction from a position adjacent the bearing place up to a width corresponding to the width of said foot plate at said foot plate.

16. A foot pedal according to claim 1, wherein said profile member is constructed as a cylindrical member having its longitudinal axis extending between the foot plate and the bearing place.

17. A foot pedal according to claim 16, characterized in that the width of the foamed material layer is enlarged substantially conically from a position adjacent the bearing place up to the width of the foot plate at the foot plate.

18. A foot pedal according to claim 17, wherein the thickness of said foamed material layer is enlarged continuously over the entire length of the foamed material layer.

19. A foot pedal according to claim 18, wherein said foamed material layer is thicker on the upper side of said cylindrical member than on the bottom side of said cylindrical member.

* * * * *